(12) United States Patent  
Chen et al.

(10) Patent No.: US 11,548,431 B2  
(45) Date of Patent: Jan. 10, 2023

(54) SUPPORTING FRAME, CASING, ALIGNMENT MECHANISM, ALIGNMENT METHOD, AND VEHICLE LIGHT AND VEHICLE

(71) Applicant: VALEO VISION, Bobigny (FR)

(72) Inventors: Chen Chen, Wuhan (CN); Wenling Zhang, Wuhan (CN); Bin Han, Wuhan (CN)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 17/422,072

(22) PCT Filed: Dec. 24, 2019

(86) PCT No.: PCT/CN2019/127694  
§ 371 (c)(1),  
(2) Date: Jul. 9, 2021

(87) PCT Pub. No.: WO2020/135373  
PCT Pub. Date: Jul. 2, 2020

(65) Prior Publication Data  
US 2022/0097598 A1 Mar. 31, 2022

(30) Foreign Application Priority Data  
Dec. 29, 2018 (CN) .......................... 201811653135.2

(51) Int. Cl.  
*B60Q 1/076* (2006.01)  
*B60Q 1/115* (2006.01)

(52) U.S. Cl.  
CPC .............. *B60Q 1/076* (2013.01); *B60Q 1/115* (2013.01)

(58) Field of Classification Search  
CPC ........ B60Q 1/0483; B60Q 1/076; B60Q 1/06; B60Q 1/115  
See application file for complete search history.

(56) References Cited

U.S. PATENT DOCUMENTS

| 5,016,155 | A | 5/1991 | Chevance |
| 7,364,331 | B2 | 4/2008 | Tajima |
| 9,381,849 | B2 * | 7/2016 | Shibata ................... B60Q 1/06 |

(Continued)

FOREIGN PATENT DOCUMENTS

| CN | 1884906 A | 12/2006 |
| JP | 8-55501 A | 2/1996 |
| JP | 2011-51555 A | 3/2011 |

OTHER PUBLICATIONS

International Search Report dated Mar. 27, 2020 in PCT/CN2019/127694 filed Dec. 24, 2019, 2 pages.

*Primary Examiner* — Robert J May  
(74) *Attorney, Agent, or Firm* — Oblon, McClelland, Maier & Neustadt, L.L.P.

(57) ABSTRACT

A problem to be solved by an embodiment of the present invention is how to reduce the load-bearing requirement for a supporting bracket. According to an embodiment of the present invention, a supporting bracket of a vehicle headlight is disclosed, wherein the supporting bracket includes a first supporting part for supporting a low beam unit; a second supporting part for supporting a high beam unit; and a first rotary part for causing the first supporting part and the second supporting part to rotate simultaneously in a horizontal direction about the rotation axis of the first rotary part.

24 Claims, 21 Drawing Sheets

(56) References Cited

U.S. PATENT DOCUMENTS

2002/0097585 A1     7/2002   Mochizuki et al.
2004/0264208 A1   12/2004   Nishizawa
2013/0229819 A1*   9/2013   Koo .................. B60Q 1/076
                                                              362/524

\* cited by examiner

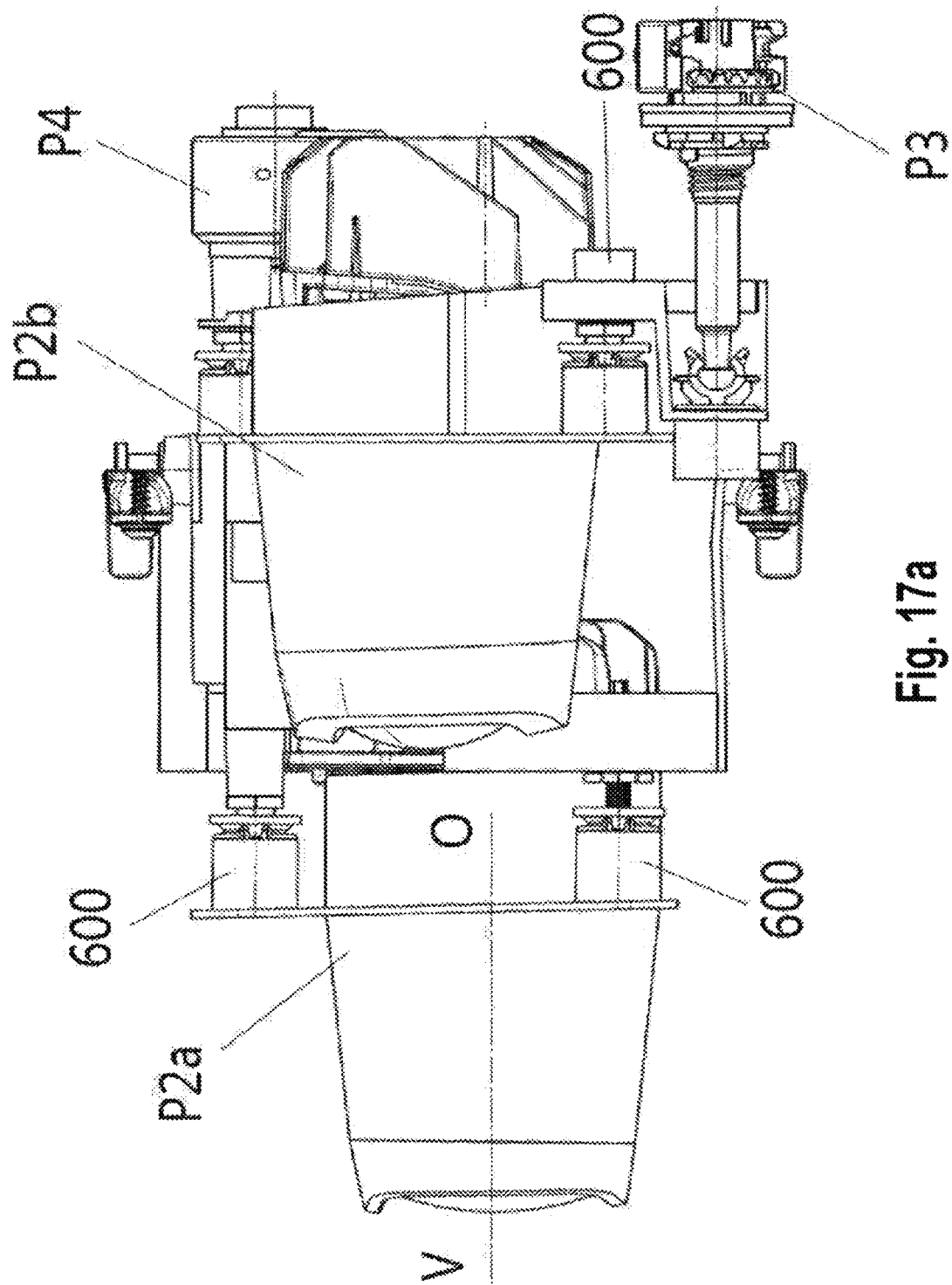

SUPPORTING FRAME, CASING, ALIGNMENT MECHANISM, ALIGNMENT METHOD, AND VEHICLE LIGHT AND VEHICLE

TECHNICAL FIELD

The present invention relates to the technical field of vehicle lights and, in particular, to a supporting bracket, a housing, an aiming mechanism, an aiming method for a vehicle headlight, and a corresponding vehicle light and vehicle.

BACKGROUND ART

The supporting bracket of a conventional vehicle headlight is directly connected to the rotation axis, with the center of gravity of the vehicle light being far away from the rotation axis. Consequently, the bracket has to bear a heavy load, which results in higher requirements for the strength and load-bearing capacity of the bracket. The bracket thus needs to be manufactured by using metals, such as aluminium, which carries a high cost.

SUMMARY OF THE INVENTION

Against the above-mentioned background, a problem to be solved by an embodiment of the present invention is how to reduce the load-bearing requirement for a bracket.

According to an embodiment of the present invention, a supporting bracket for a vehicle headlight is disclosed, the supporting bracket comprising:

at least one supporting part for supporting at least one light-emitting unit;

a first rotary part for causing the at least one supporting part to rotate simultaneously in a horizontal direction about the rotation axis of the first rotary part.

According to the solution provided by this embodiment, only one supporting bracket is needed to support a high beam unit and a low beam unit at the same time.

According to the supporting bracket of the present invention, the first rotary part is provided with a long shaft that is coaxial with the rotation axis.

According to the supporting bracket of the present invention, the first rotary part comprises a pair of short shafts, the short shaft comprising:

an upper short shaft and a lower short shaft; both the upper short shaft and the lower short shaft are coaxial with the rotation axis.

According to the supporting bracket of the present invention, the first rotary part comprises a cavity structure for accommodating a corresponding rotation axis structure and rotating based on the rotation axis.

According to the solution provided by this embodiment, the first rotary part may be a shaft or a cavity structure accommodating a shaft, so that the supporting bracket is capable of rotating about its corresponding rotation axis; in other words, the light group unit could be adjusted in a horizontal direction.

According to the supporting bracket of the present invention, the first rotary part is further used for connecting the supporting bracket to the housing in the direction of the rotation axis.

According to the solution provided by this embodiment, by this connection method, the distance between the center of gravity of a light group unit and the rotation axis may be reduced, and thus the load-bearing moment of the force of the supporting bracket is reduced; this allows a reduction in the load-bearing requirement for the supporting bracket, so that the supporting bracket may be manufactured with a material that has a lower strength.

According to the supporting bracket of the present invention, clamping parts are provided at two ends of the first rotary part, and the supporting bracket clamps with the housing in an extension direction of the rotation axis by the clamping part of the first rotary part.

According to the solution provided by this embodiment, the clamp is carried out in an extension direction of the axis to ensure that the moment of force is reduced.

According to the supporting bracket of the present invention, the first rotary part is an independent component, wherein when the first rotary part is an independent component, it may be manufactured separately with a high-strength material, so as to deliver better overall performance.

According to the supporting bracket of the present invention, the first rotary part further comprises:

an occluding part for causing the first rotary part and the supporting bracket to occlude with each other, thereby driving the supporting bracket and the first rotary part to rotate simultaneously.

The adoption of an occluding part allows the first rotary part to remain capable of driving the supporting bracket to rotate simultaneously when the first rotary part is independent of the supporting bracket.

According to the supporting bracket of the present invention, the supporting bracket is integrated with the first rotary part.

The integration of the first rotary part into the supporting bracket makes the supporting bracket more integrated as a whole, thereby preventing the problem of non-simultaneous rotation caused by poor occlusion effect of the first rotary part with the rest of the supporting bracket.

According to the supporting bracket of the present invention, the supporting bracket further comprises:

a second rotary part for causing the at least one supporting part to rotate simultaneously in a vertical direction.

The simultaneous rotation of the at least one supporting part in a vertical direction enables the light group unit to be adjusted in a vertical direction.

According to the supporting bracket of the present invention, the second rotary part and the at least one beam unit (P2) are respectively connected by a universal connection structure.

With a universal connection structure, when the second rotary part moves forwards or backwards, the at least one light-emitting unit is driven to move downwards and upwards, so that vertical adjustment could be achieved.

According to the supporting bracket of the present invention, the supporting bracket is further provided with a first movable part, and the second rotary part is provided with a second movable part that matches the first movable part, so that the second rotary part may slide along forward and backward directions of the supporting bracket by coordination between the first sliding part and the second sliding part.

By the first and second movable parts, the second rotary part may move forwards and backwards, thereby driving a light-emitting unit to move.

According to the supporting bracket of the present invention, when sliding back and forth along the first movable part, the second rotary part pushes and pulls the high beam unit and the low beam unit simultaneously to tilt downwards or upwards in a vertical direction around the respective universal connection structure.

According to the supporting bracket of the present invention, the at least one supporting part comprises a first supporting part and a second supporting part, wherein the corresponding light-emitting unit comprises a high beam unit and a high beam-low beam unit.

According to the solution provided by this embodiment, aiming of the high beam light and the low beam light could be achieved conveniently.

According to an embodiment of the present invention, a housing for a vehicle headlight is disclosed, wherein the housing is provided with a clamp matching part that matches a first rotary part of the support structure, so that the support structure is mounted on the housing.

According to the housing of the present invention, the supporting bracket is provided with the cavity structure, the housing is provided with the rotation axis structure, and the rotation axis structure is rotatable in the cavity structure.

According to the housing of the present embodiment, the rotation axis structure is integrated, and the corresponding supporting bracket is provided with a cavity structure; when pushed, the supporting bracket is rotatable in a horizontal direction about the rotation axis structure on the housing.

According to an embodiment of the present invention, an aiming mechanism for vehicle headlights is disclosed, wherein the aiming mechanism comprises:

the supporting bracket;

a first pushing part for pushing the supporting bracket to rotate in a horizontal direction, thereby driving the at least one light-emitting unit to rotate simultaneously in a horizontal direction; and a second pushing part for pushing the at least one light-emitting unit to simultaneously tilt downwards or upwards in a vertical direction.

According to the aiming mechanism of the present invention, a position of the rotation axis of the first rotary part of the supporting bracket may be determined on the basis of a maximum adjustment distance of the first pushing part and a maximum rotation angle of the supporting bracket.

According to the aiming mechanism of the present invention, the first pushing part and the second pushing part may respectively adopt at least one of the following adjustment methods:

manual adjustment, and adjustment by a motor.

By the above-mentioned adjustment methods, the aiming mechanism may be effectively adjusted in the vertical and horizontal directions.

According to the aiming mechanism of the present invention, the first pushing part is adjusted manually, and the second pushing part is adjusted by drive of a motor.

The aiming mechanism according to the present invention further comprises the housing.

According to an embodiment of the present invention, a vehicle light is disclosed that adopts the aiming mechanism as described above.

According to an embodiment of the present invention, a vehicle is disclosed that comprises the vehicle light as described above.

According to an embodiment of the present invention, a method for aiming vehicle headlights is disclosed, the vehicle headlights adopting the aiming mechanism described above, wherein the aiming method comprises the following steps:

adjusting the first pushing part so that the first pushing part pushes and pulls the supporting bracket, causing the supporting bracket to rotate about the rotation axis in the middle thereof; in other words, the at least one supporting part rotates simultaneously about the rotation axis, so that the light-emitting unit rotates simultaneously in a horizontal direction; and adjusting the second pushing part so that the second pushing part slides back and forth along the sliding chute structure of the supporting bracket, while pushing and pulling the at least one light-emitting unit to simultaneously tilt downwards or upwards in a vertical direction about the respective universal connection structure.

Compared with the prior art, the present invention has the following advantages: since the supporting bracket is connected to the housing by its own first rotary part, the center of gravity of the bracket is brought closer to the rotation axis, so that the moment of force formed by the distance between the center of gravity of a light group unit and the rotation axis is greatly reduced; thus, the load-bearing requirement for the supporting bracket is reduced; in other words, the requirement for the strength of a material used to manufacture the supporting bracket is reduced, which allows a great reduction in material cost.

BRIEF DESCRIPTION OF THE DRAWINGS

Other characteristics, objectives, and advantages of the present invention will be made more apparently by reading a detailed description of the non-limiting embodiments with reference to the following drawings.

FIGS. 17a, 17b, and 17c show a schematic diagram for rotation of a vehicle headlight in a vertical direction according to an embodiment of the present invention;

Figure 1:
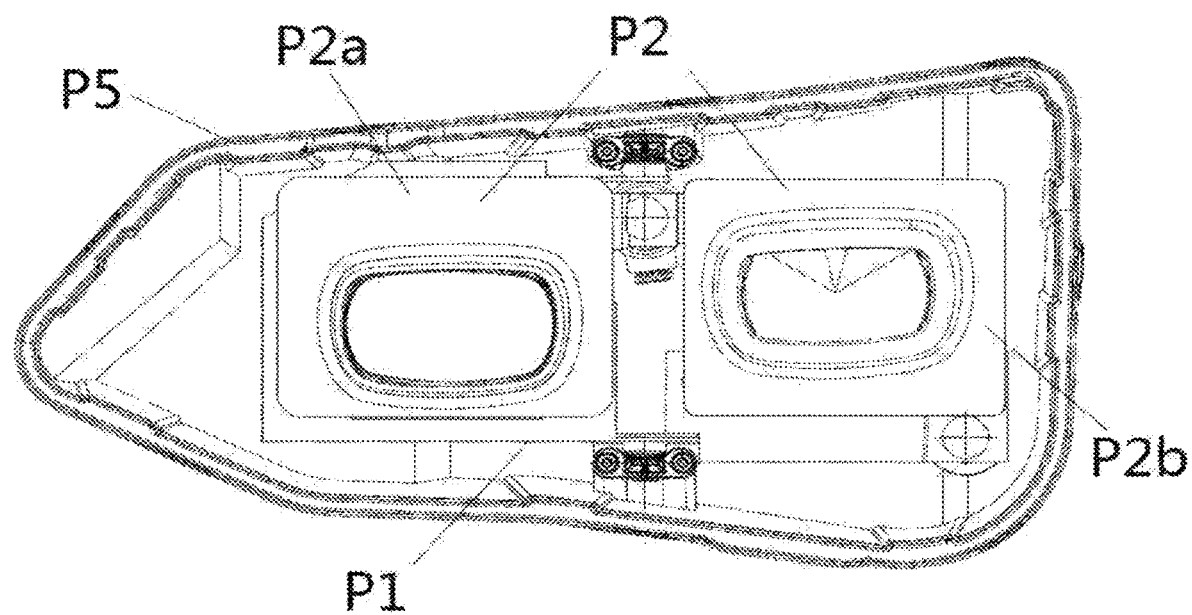
FIG. 1 shows a schematic diagram for the overall three-dimensional structure of a vehicle headlight according to an embodiment of the present invention.

The following is a list of the reference numerals and the components:

| P1 | Support bracket | P2 | Light-emitting unit |
|---|---|---|---|
| P2a | High beam unit | P2b | High beam-low beam unit |
| P3 | First pushing part | P4 | Second pushing part |
| P5 | Housing | 100 | Supporting part |
| 100a | First supporting part | 100b | Second supporting part |
| 300 | First rotary part | 400 | Occlusion matching part |
| 500 | Second rotary part | 600 | Universal connection structure |
| 700 | First movable part | 800 | Clamp matching part |
| 900 | Rotation axis structure | 310 | Long shaft |
| 320 | Short shaft | 320a | Upper short shaft |
| 320b | Lower short shaft | 330 | Clamping part |
| 340 | Occluding part | 350 | Cavity structure |
| 510 | Second movable part | 520 | Pushing connection part |
| 610 | Universal ball socket | 620 | Universal ball joint |

EMBODIMENTS

Preferred embodiments of the present invention will be described below in greater detail in conjunction with the drawings. Although preferred embodiments of the present invention are shown in the drawings, it should be understood that the present invention may be implemented in various forms, instead of being limited by the embodiments described herein. These embodiments are provided to allow a more thorough and complete understanding of the present invention, and completely convey the scope of the present invention to those of ordinary skill in the art.

According to an embodiment of the present invention, a supporting bracket, an aiming mechanism, an aiming method for vehicle headlights, as well as corresponding vehicle light and vehicle are disclosed.

The headlight according to the present invention, as a whole, comprises a supporting bracket P1, at least one light-emitting unit P2, a first pushing part P3, a second pushing part P4, and a housing P5, wherein the supporting bracket P1 comprises at least one supporting part 100 that respectively corresponds to the at least one beam unit P2.

In other words, each light-emitting unit P2 is provided with a corresponding supporting part 100, and each light-emitting unit P2 is connected to its corresponding supporting part 100 by a universal connection structure 600. Thus, when the supporting part 100 remains stationary, each light-emitting unit is still rotatable in a vertical direction or a horizontal direction about the universal connection structure 600.

Figure 13:
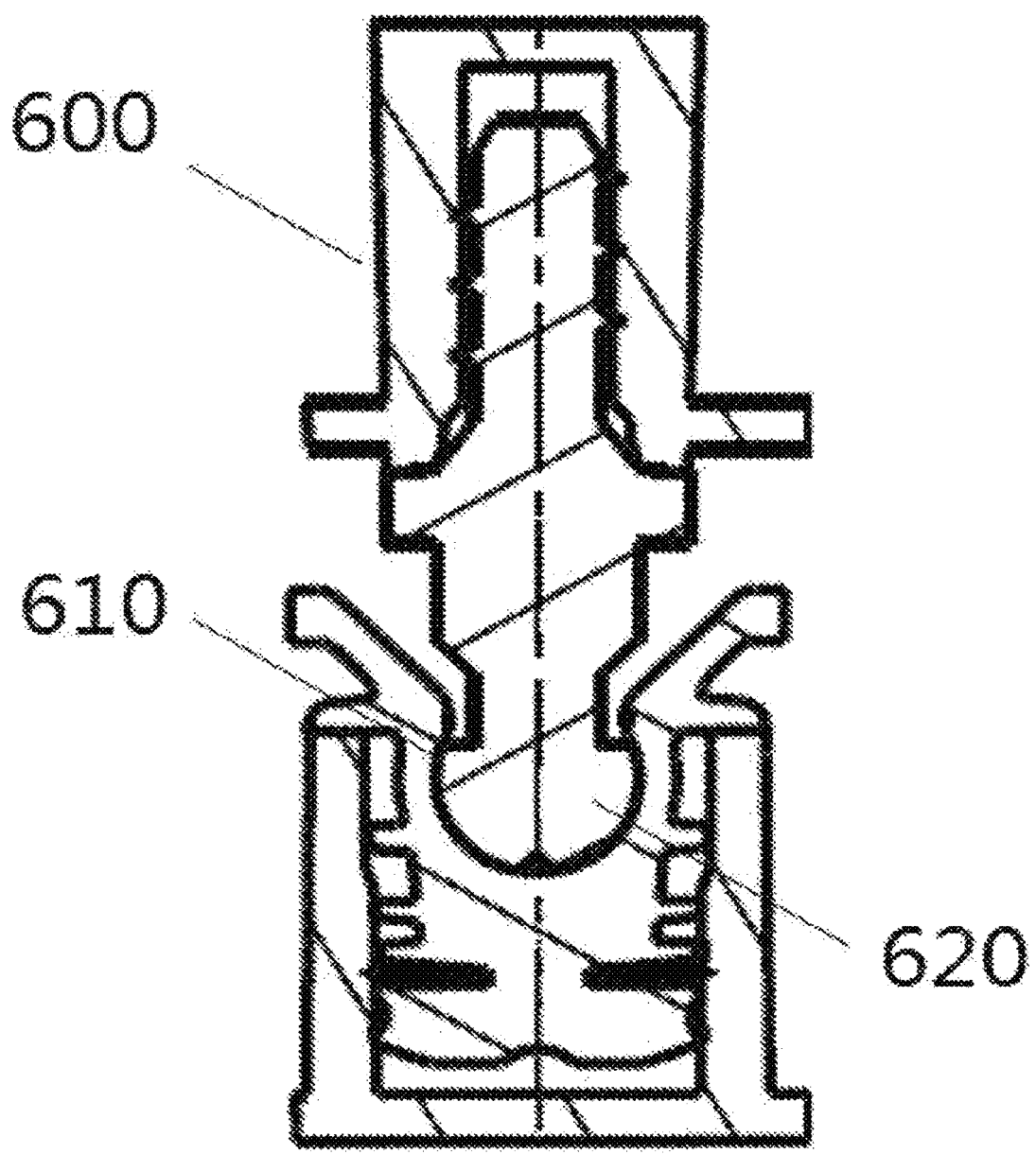
FIG. 13 schematically shows a cross-sectional view of a universal connection structure according to an embodiment of the present invention.

Preferably, referring to FIG. 13, the universal connection structure 600 takes a form in which a ball socket 610 coordinates with a universal ball joint 620.

According to a first example of the present invention, at least one light-emitting unit P2 comprises a high beam unit P2a and a high beam-low beam unit P2b, and the supporting bracket P1 comprises a first supporting part 100a and a second supporting part 100b that correspond to the high beam unit P2a and the high beam-low beam unit P2b.

Figure 2:
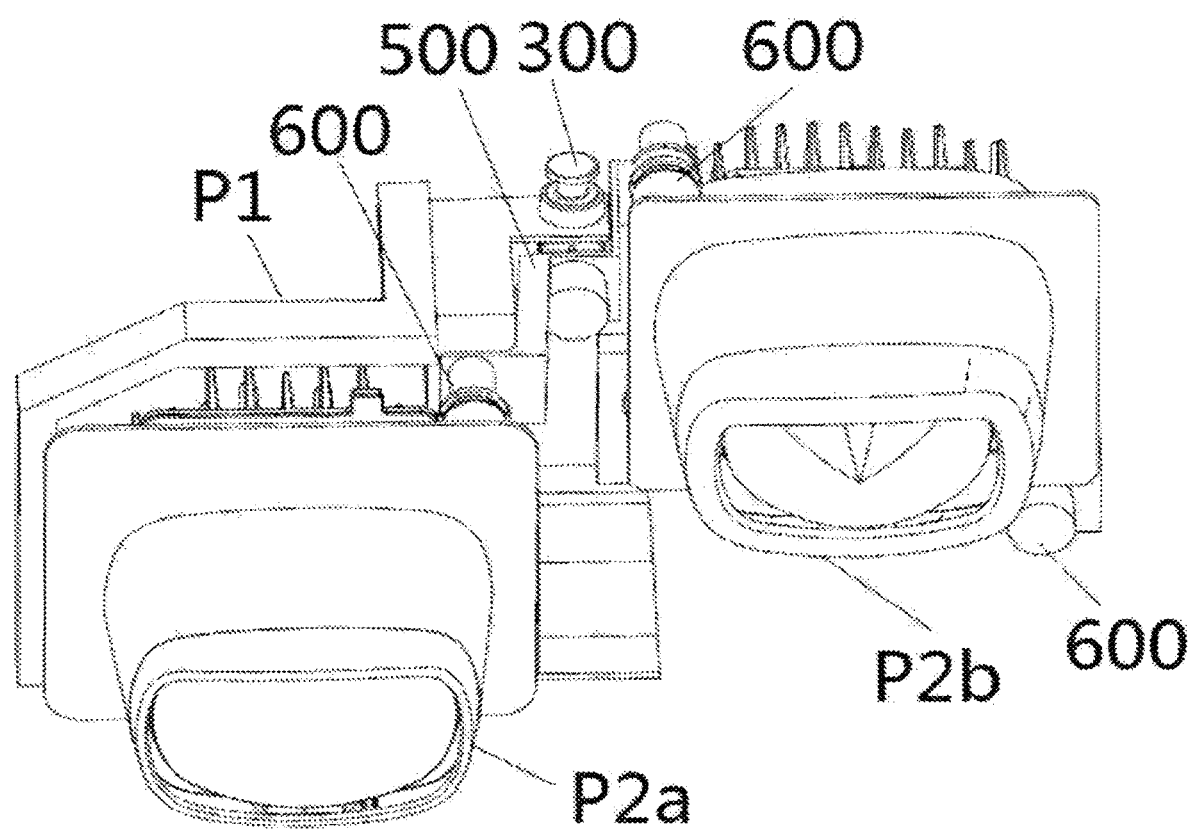
FIGS. 2 and 3 respectively show a three-dimensional schematic diagram for an aiming mechanism according to an embodiment of the present invention.
Figure 3:
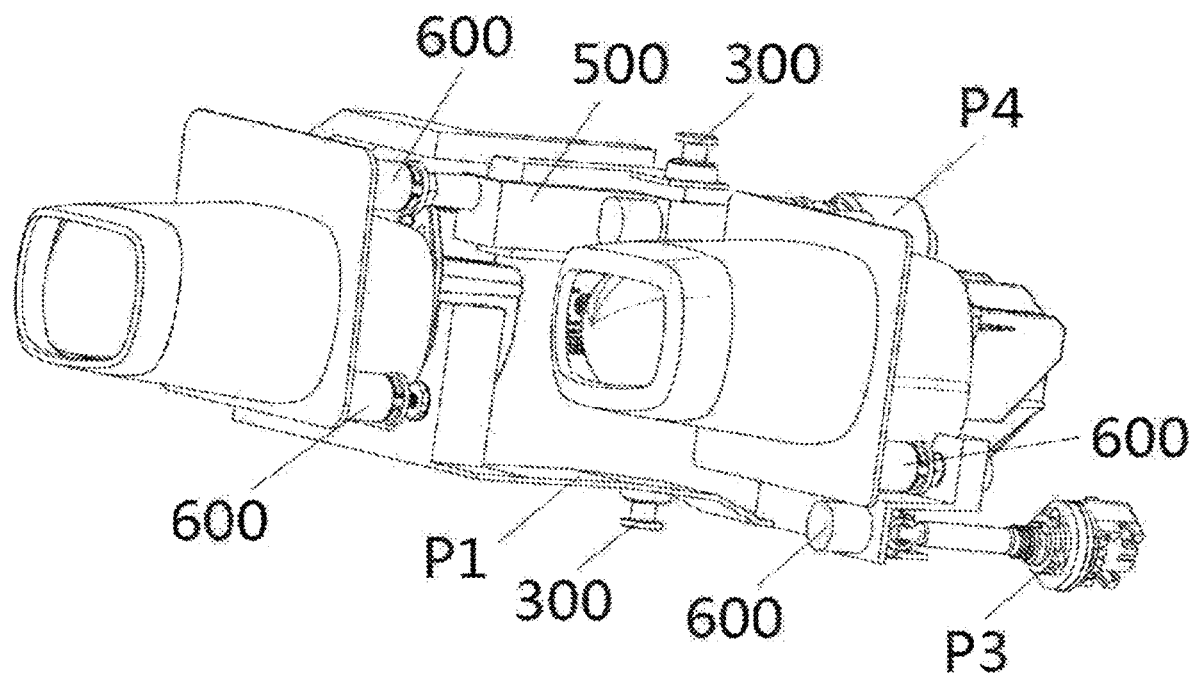

See FIGS. 1 to 3 in conjunction. FIG. 1 shows a schematic diagram for the overall three-dimensional structure of a vehicle headlight according to an embodiment of the present invention; FIGS. 2 and 3 respectively show a three-dimensional schematic diagram for an aiming mechanism according to an embodiment of the present invention.

Figure 18A:
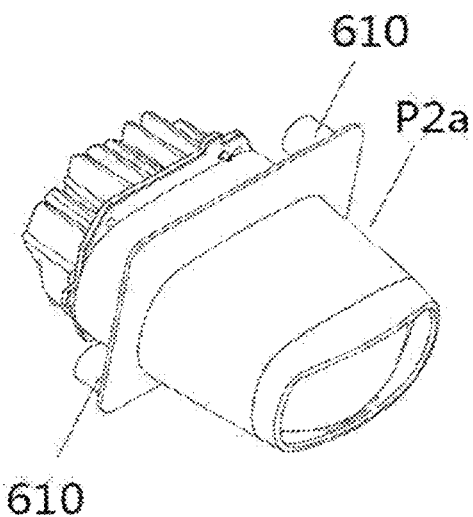
FIGS. 18a and 18b respectively schematically show the three-dimensional and rear diagrams for a low beam unit according to an embodiment of the present invention.
Figure 18B:
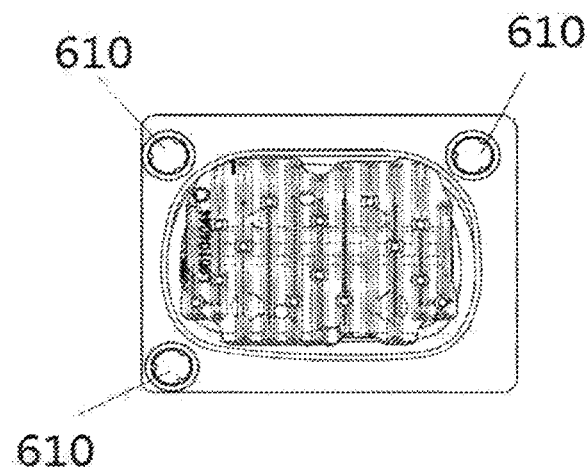
Figure 18C:
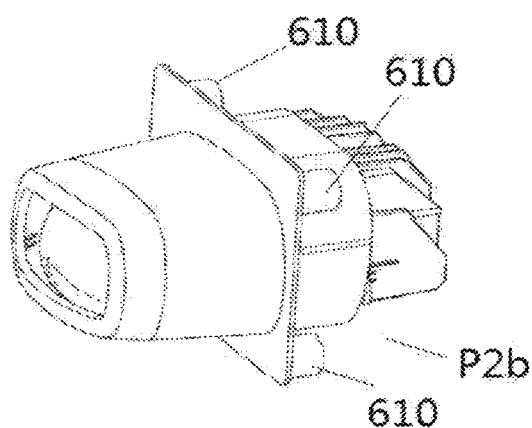
FIGS. 18c and 18d respectively schematically show the three-dimensional and rear diagrams for a high beam unit according to another embodiment of the present invention.
Figure 18D:
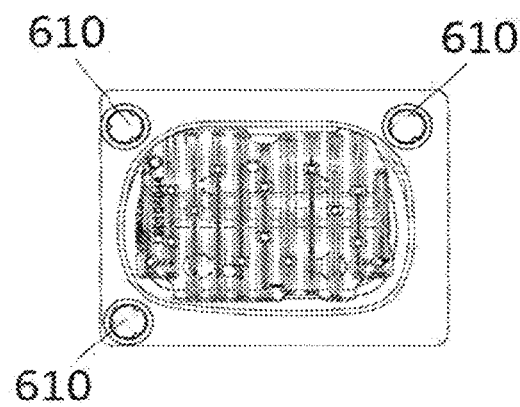

According to an embodiment of the present invention, the high beam unit P2a is shown in FIGS. 18a and 18b, and the high beam-low beam unit P2b is shown in FIGS. 18c and 18d.

The high beam unit P2a as shown in the figure can emit part of a high beam, and the high beam-low beam unit P2b as shown in the figure can switch between emitting a low beam and emitting part of a high beam.

Specifically, the high beam unit P2a and the high beam-low beam unit P2b are respectively provided with at least three ball sockets 610 for matching the corresponding universal ball joint 620, thereby being respectively connected to the first supporting part 100a and the second supporting part 100b.

In an aiming mechanism according to an embodiment of the present invention, the first pushing part P3 is used for pushing the supporting bracket P1 to rotate in a horizontal direction, thereby driving the high beam unit P2a and the low beam unit P2b to simultaneously rotate in the horizontal direction; the second pushing part P4 is used for pushing the high beam unit P2a and the low beam unit P2b to simultaneously tilt in a vertical direction.

Specifically, the first pushing part P3 is connected to a rim of the supporting structure P1 by the universal connection structure 600 to push the supporting structure P1 to rotate about the rotation axis EE'.

Preferably, the universal connection structure 600 for enabling the connection between the first pushing part P3 and the supporting structure P1 is located at the outer side of the light-emitting unit, wherein the light-emitting units are close to each other at the inner side and far away from each other at the outer side.

For example, the universal connection structure 600 is located on the vertical side rim of the supporting structure P1. Another example is that the universal connection structure 600 is located at the corner where the vertical side rim and the lower horizontal rim of the supporting structure P1 intersects with each other.

Those of ordinary skill in the art should be able to, according to actual conditions and requirements, determine a position at which the first pushing part P3 is connected to the supporting bracket P1.

More specifically, when the first pushing part P1 moves forwards or backwards, the connected universal ball joint 620 is driven so that the supporting bracket P1 rotates in a horizontal direction about the rotation axis EE' of the first rotary part 300.

Figure 9A:
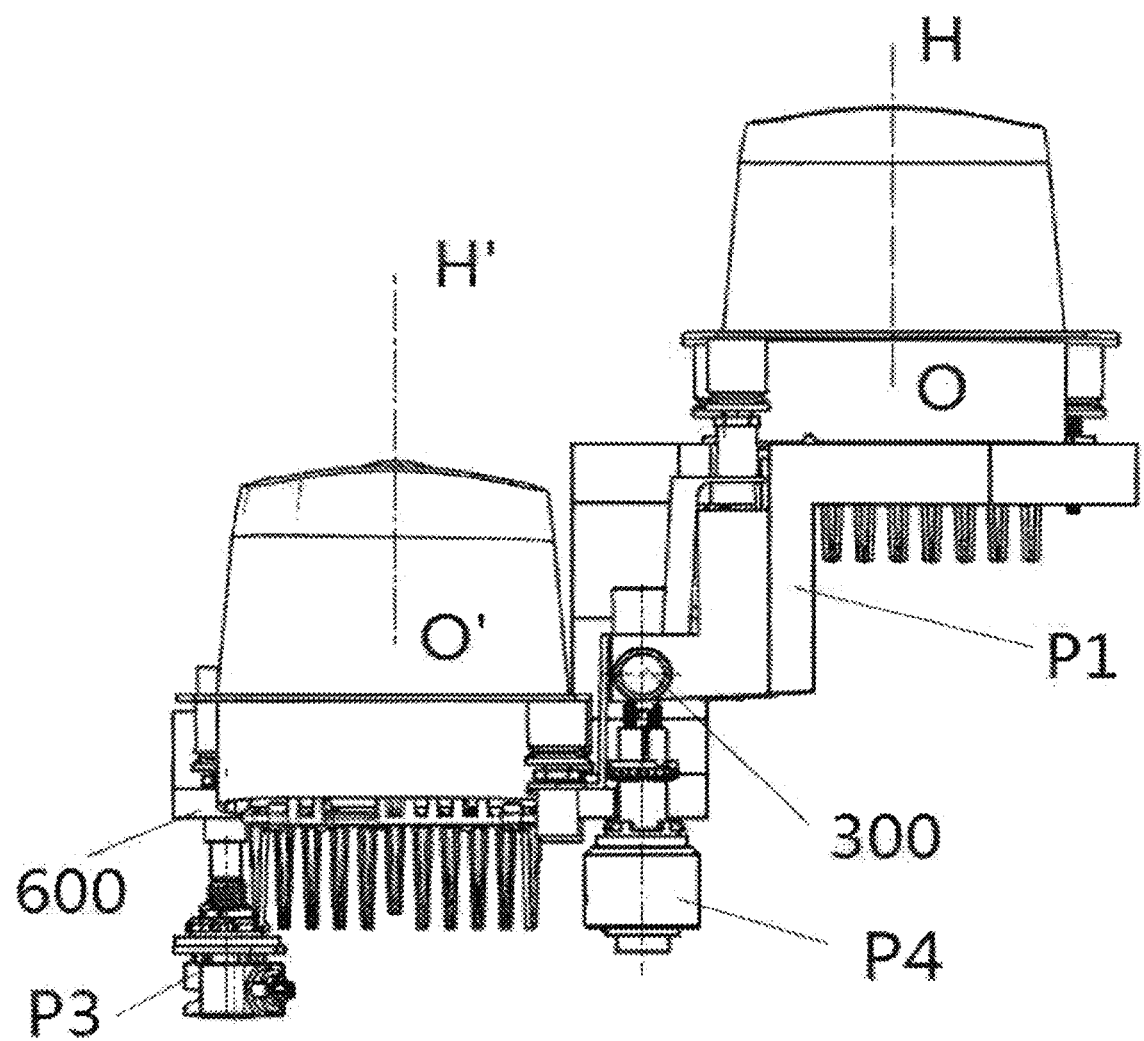
FIGS. 9a, 9b, and 9c respectively show a schematic diagram for rotation of an aiming mechanism in a horizontal direction according to an embodiment of the present invention.
Figure 9B:
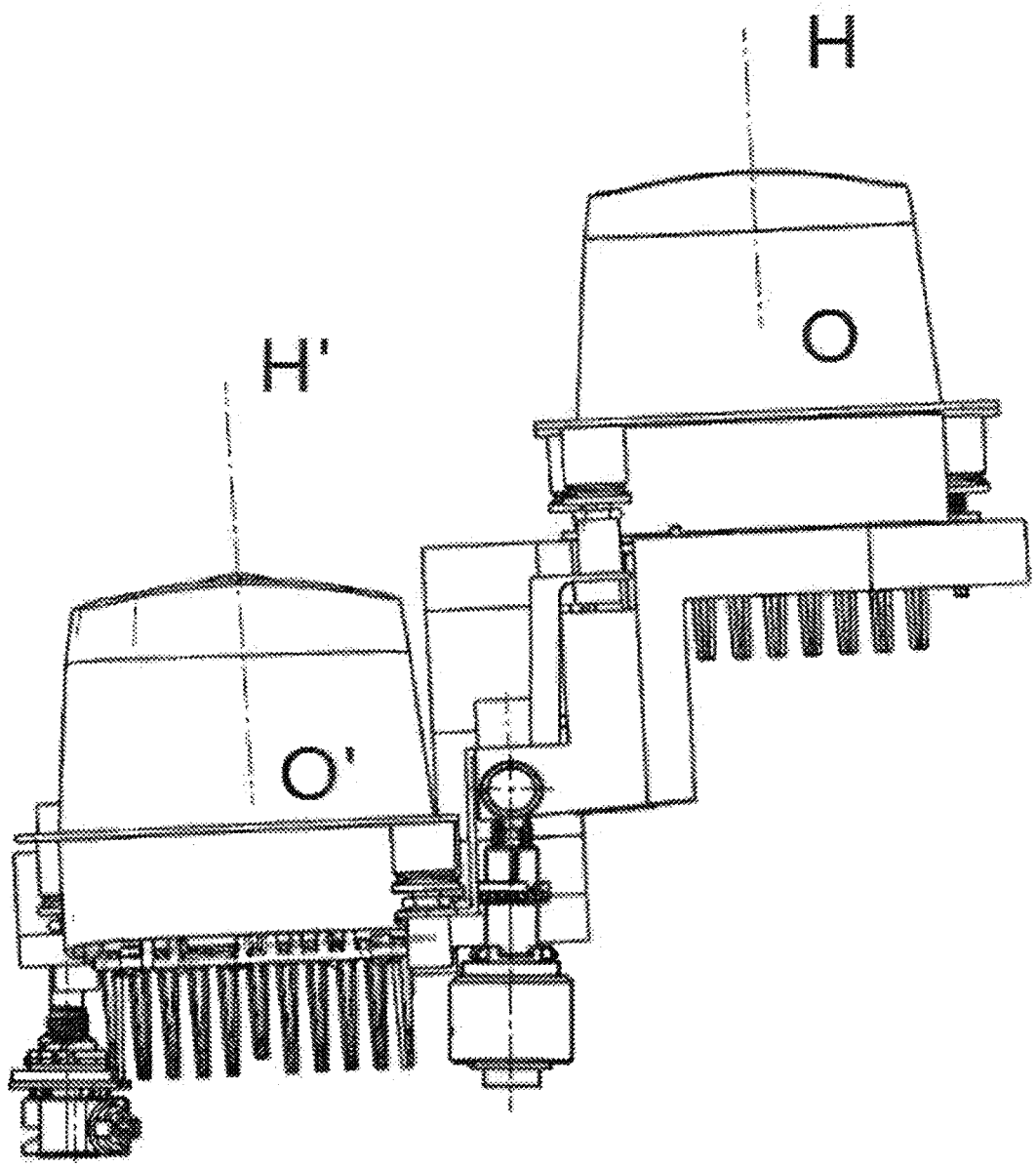
Figure 9C:
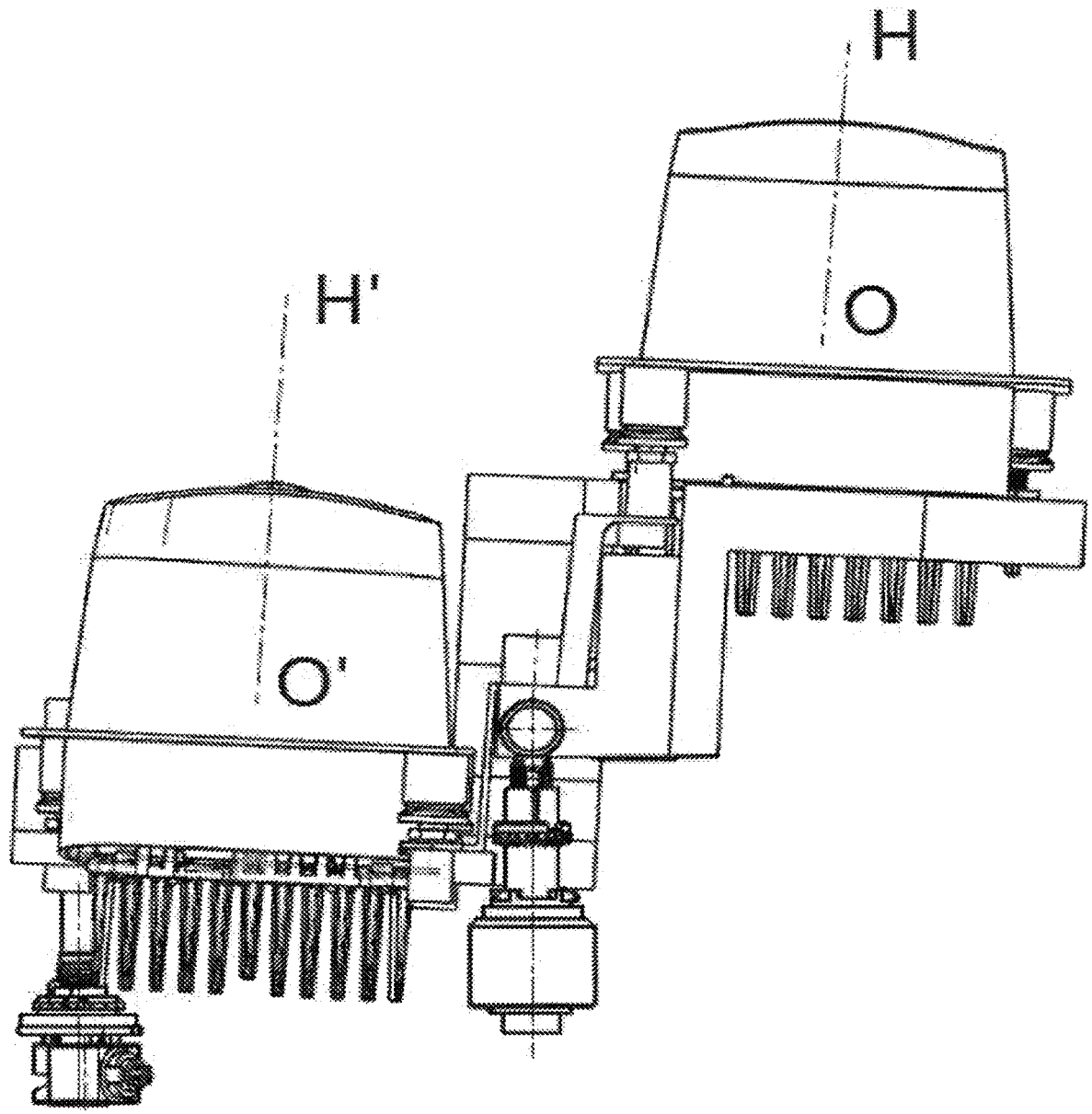
Figure 10:
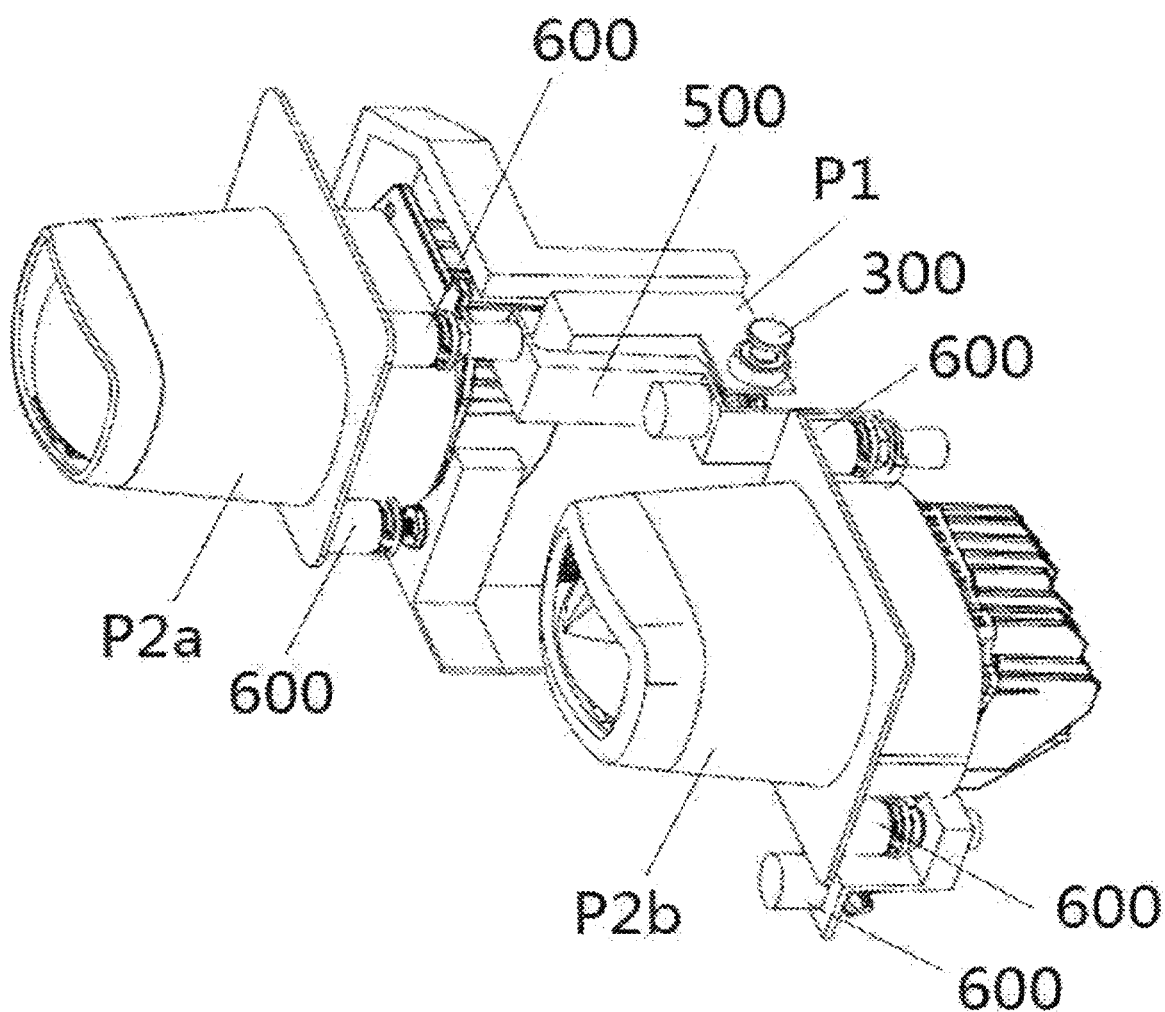
FIG. 10 schematically shows a three-dimensional top view of a vehicle headlight according to an embodiment of the present invention.
Figure 11:
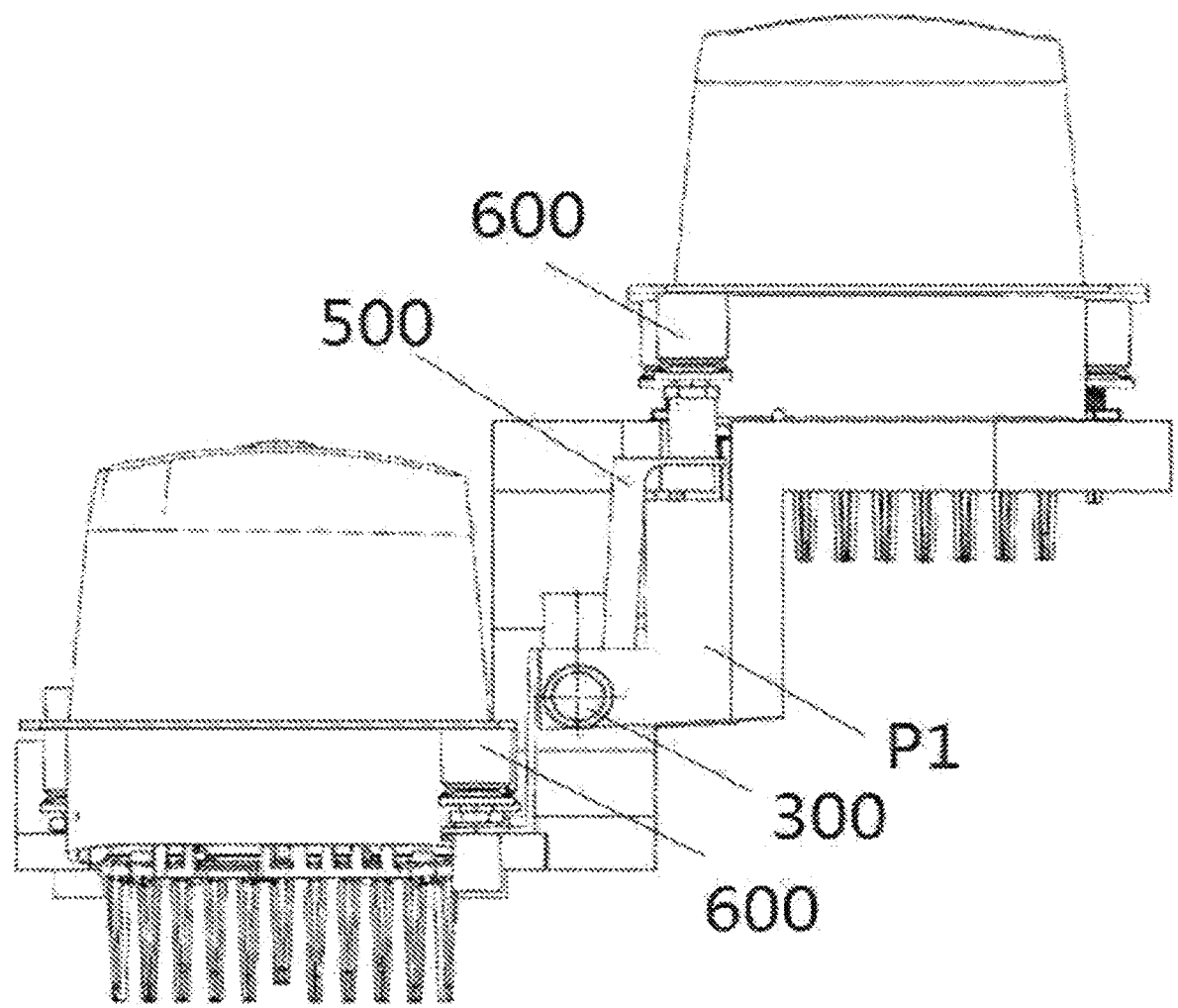
FIG. 11 schematically shows, from a top view angle, a vehicle headlight according to an embodiment of the present invention.
Figure 12:
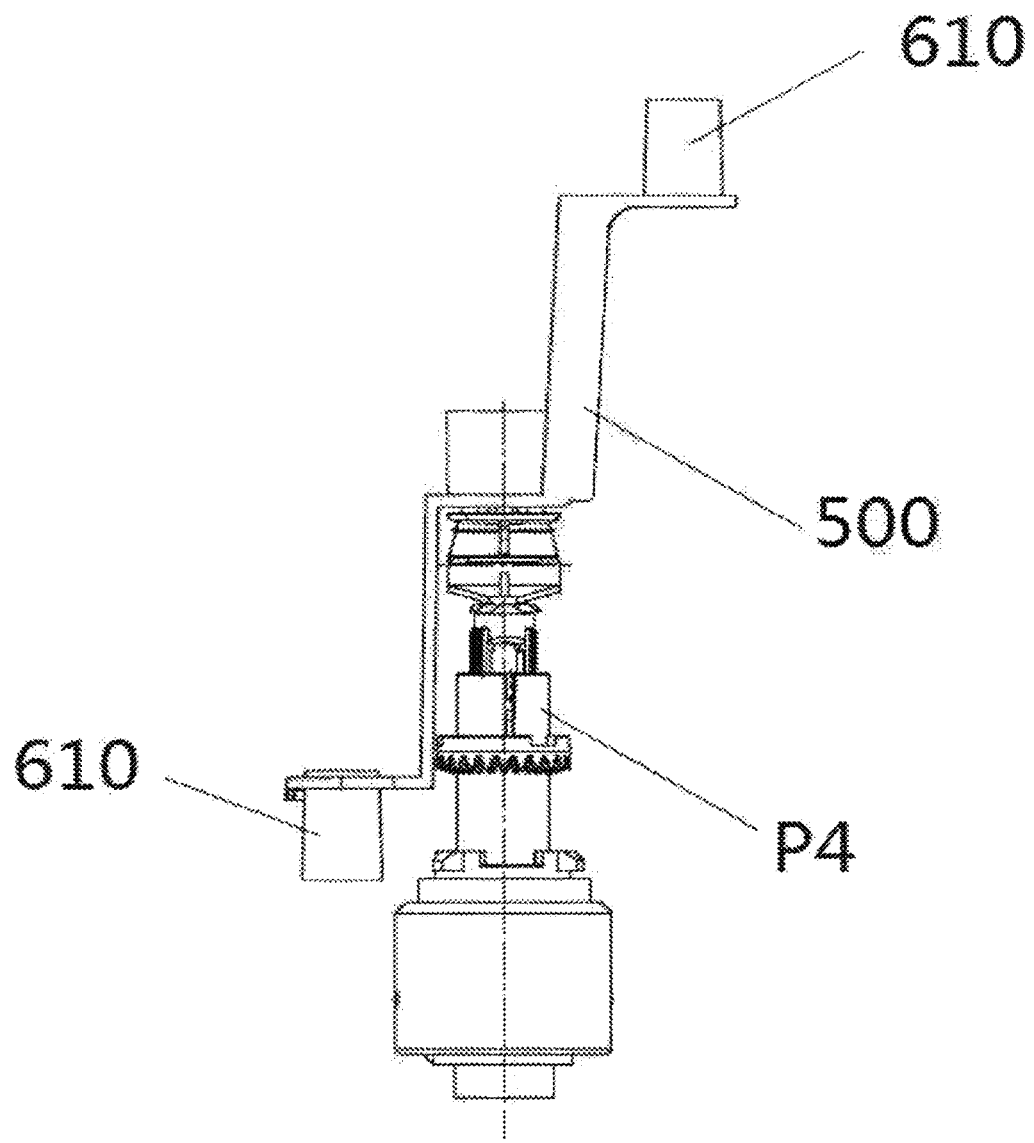
FIG. 12 schematically shows, from a top view angle, a pushing structure according to an embodiment of the present invention.

Still referring to the drawings, FIGS. 9a, 9b, and 9c respectively show a schematic diagram for rotation of an aiming mechanism in a horizontal direction according to an embodiment of the present invention, wherein OH indicates the forward axis in the horizontal plane of the low beam unit P2a, and O'H' indicates the forward axis in the horizontal plane of the high beam unit P2b. The axes OH and O'H' respectively indicate the direction in which the front of the corresponding light-emitting unit P2 faces. By the rotation of the axes OH and O'H', how the supporting bracket P1 drives the two light-emitting units P2 to rotate in a horizontal direction may be seen more clearly.

Moreover, since the second rotary part 500 is located on the supporting bracket P1, when the supporting bracket P1 rotates in a horizontal direction, the second rotary part 500 is driven to simultaneously rotate in a horizontal direction about the universal ball joint 520 between it and the second pushing part P4, wherein those of ordinary skill in the art should be able to, according to actual conditions and requirements, determine respective maximum adjustment distances of the first pushing part P3 and the second pushing part P4.

For example, according to actual requirements, the maximum adjustment distance of the first pushing part P3 may be set to 4 mm-6 mm, and the maximum adjustment distance of the second pushing part P4 may be set to 4 mm-6 mm. Another example is that the maximum adjustment distance of forward adjustment of the second pushing part P3 may be set to 4 mm-5 mm, and the maximum adjustment distance of backward adjustment thereof may be set to 5 mm-6 mm.

Moreover, those of ordinary skill in the art should be able to, according to actual conditions and requirements, determine respective maximum adjustment angles of the supporting bracket P1 in a horizontal direction and in a vertical direction.

For example, the maximum rotation angle of the supporting bracket P1 in a horizontal direction may be set to 3 degrees-5 degrees, and the maximum rotation angle of the supporting bracket P1 in a vertical direction may be set to 3 degrees-5 degrees.

Preferably, a position of the rotation axis EE' of the first rotary part 300 of the supporting bracket P1 may be determined on the basis of a maximum adjustment distance of the first pushing part P3 and a maximum rotation angle of the supporting bracket P1.

For example, assuming that the adjustment distance of the first pushing part P3 is s1 and that the maximum rotation angle of the supporting bracket P1 in a horizontal direction is $\alpha$ degrees, then the distance between the first rotation axis EE' and the first pushing part P3 is $s1/(\tan\alpha)$.

More preferably, on the basis of a position of the rotation axis EE', a position of the first rotary part 300 may be further determined.

Figure 17B:
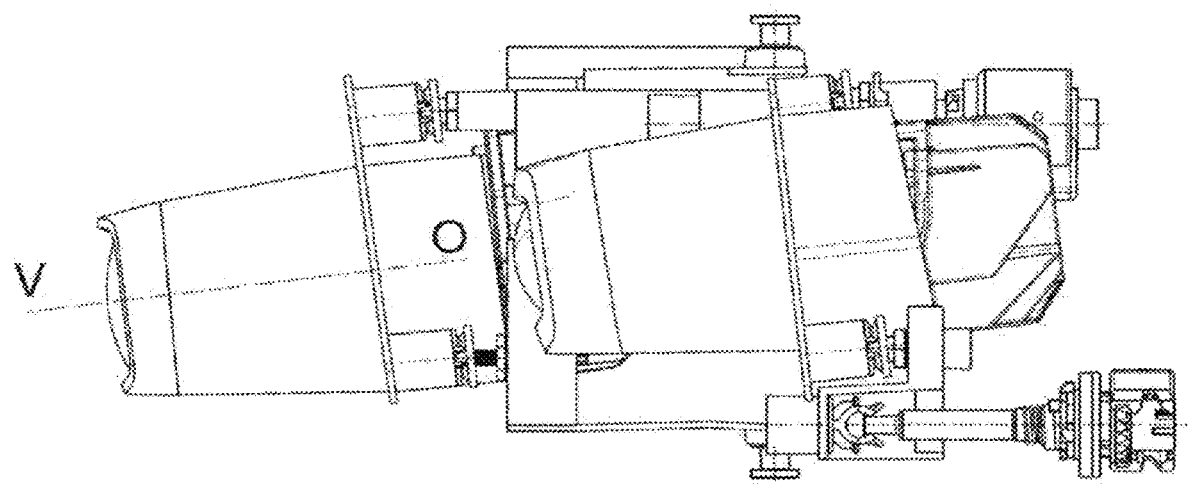
Figure 17C:
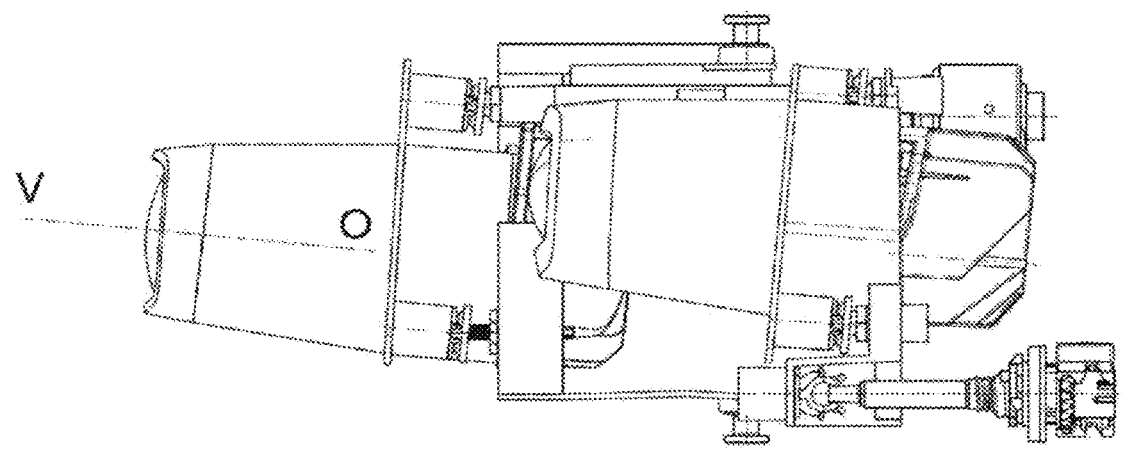

Next, see FIGS. 17a, 17b and 17c. FIGS. 17a, 17b, and 17c show a schematic diagram for rotation of a vehicle headlight in a vertical direction according to an embodiment of the present invention.

The axis OV is the orientation axis of the light groups unit P2 in the vertical direction, which is used for indicating the direction in which the front of the light group unit P2 faces. The rotation of the axis OV makes it possible to see more clearly how the light group unit P2 is directly driven to rotate in a vertical direction when the second rotary part 500 moves back and forth.

The second rotary part 500 is connected to each light-emitting unit P2, respectively, by using at least one universal connection structure 600. The second rotary part 500 is pushed forwards or pulled backwards by the second pushing part P4.

The second rotary part 500 is connected to the second pushing part P4 by the pushing connection part 520.

Preferably, the second rotary part 500 can rotate at least around the pushing connection part 520 in a horizontal direction.

More preferably, the pushing connection part 520 also adopts a universal connection structure.

When the second pushing part P4 pushes the second rotary part 500 forwards or backwards to drive each light-emitting unit P2 to tilt upwards or downwards in a vertical direction, the supporting bracket P1 can remain stationary.

According to a preferred solution provided by this embodiment, the first pushing part P3 and the second pushing part P4 may respectively adopt at least one of the following adjustment methods:

1) manual adjustment; and
2) adjustment by a motor. For example, the first pushing part P3 is adjusted manually, and the second pushing part P4 is adjusted by a motor.

Another example is that the first pushing part P3 may support manual adjustment and adjustment by a motor at the same time.

The first rotary part 300 of the supporting bracket P1 will be described next.

The first rotary part 300 is used for causing the at least one supporting part 100 to simultaneously rotate in a horizontal direction about the rotation axis EE' of the first rotary part 300.

The first rotary part 300 may be in the form of a shaft, or may be in the form of a cavity accommodating a shaft.

Preferably, the first rotary part 300 is realized in forms including, but not limited to, any of the following:

1) a long shaft 310 coaxial with the rotation axis, wherein the long shaft 310 penetrates the upper rim and the lower rim of the supporting bracket P1;
2) a pair of short shafts 320, wherein the short shafts 320 comprises an upper short shaft 320a and a lower short shaft 320b; both the upper short shaft 320a and the lower short shaft 320b are coaxial with the rotation axis; and
3) a cavity structure 350, the cavity structure 350 being used for accommodating the corresponding rotation axis structure, and rotating based on the rotation axis.

Preferably, the supporting bracket P1 is connected to the housing P5 by the first rotary part 300 in the direction of the rotation axis.

Specifically, clamping part 330 is provided at two ends of the first rotary part 300, and the supporting bracket P1 clamps with the housing P5 in an extension direction of the rotation axis by the clamping part 330 of the first rotary part 300.

Those of ordinary skill in the art should understand that the clamping part 330 may take a plurality of forms.

Figure 7:
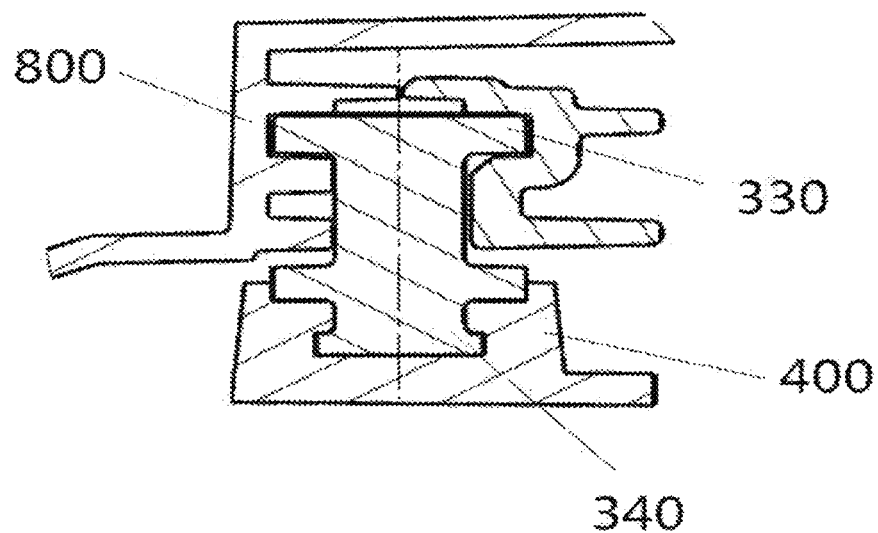
FIGS. 7 and 8 respectively schematically show a cross-sectional view of a first rotary part according to an embodiment of the present invention.
Figure 8:
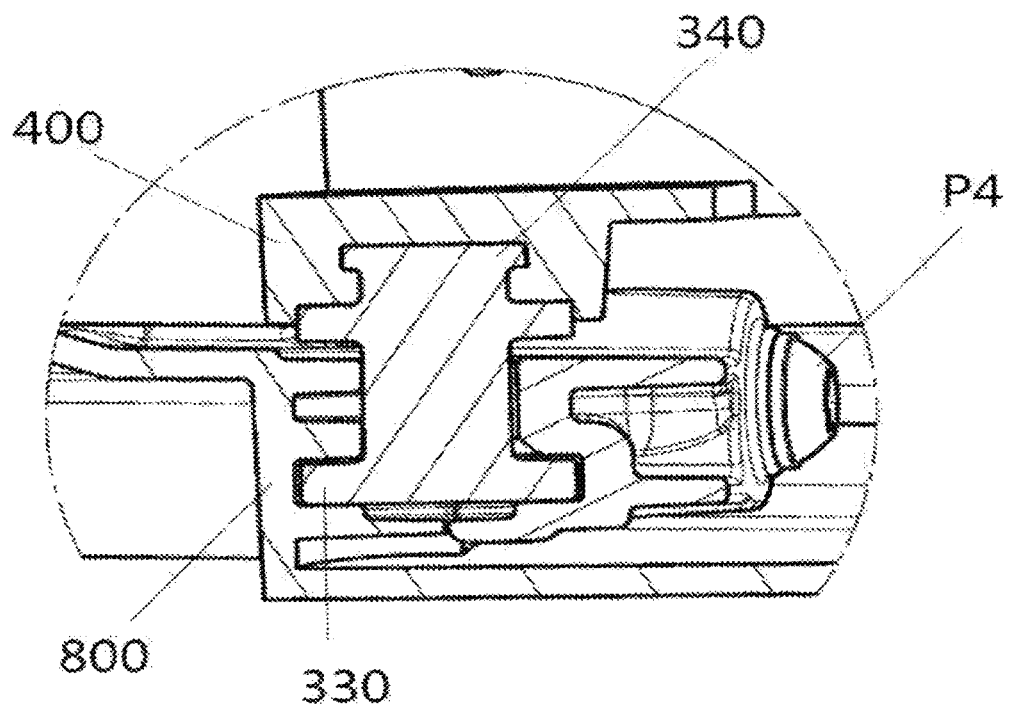

For example, the clamping part 330 may adopt a protruding structure on the shaft as shown in FIGS. 7 and 8; another example is that a structure, for example, a ball joint, may be used at the end of the shaft to allow clamp.

Figure 4:
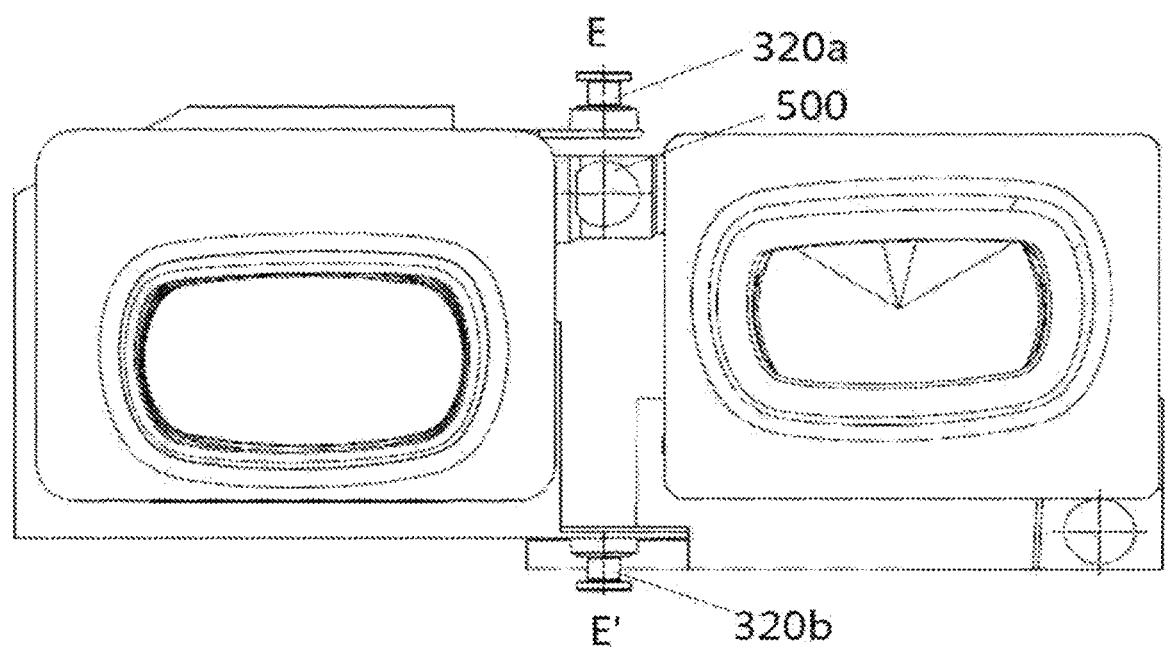
FIG. 4 schematically shows, from a front angle, an aiming mechanism according to an embodiment of the present invention.
Figure 5:
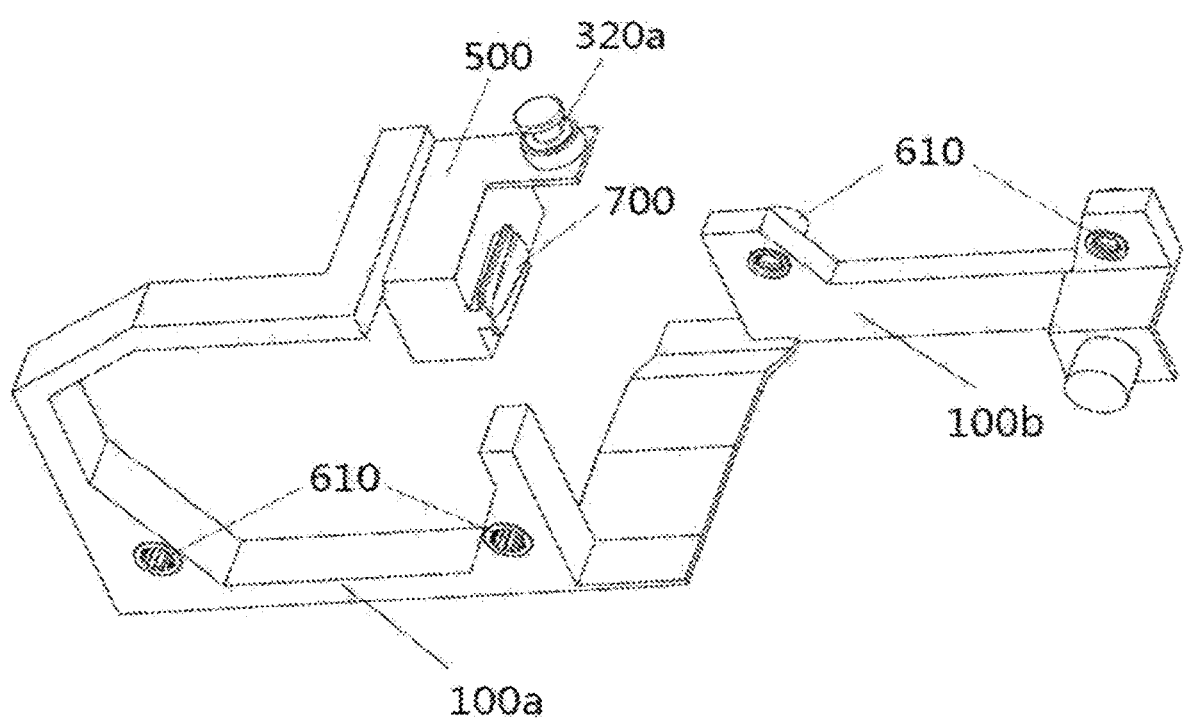
FIG. 5 shows a schematic diagram for a three-dimensional structure of a supporting bracket according to an embodiment of the present invention.
Figure 6:
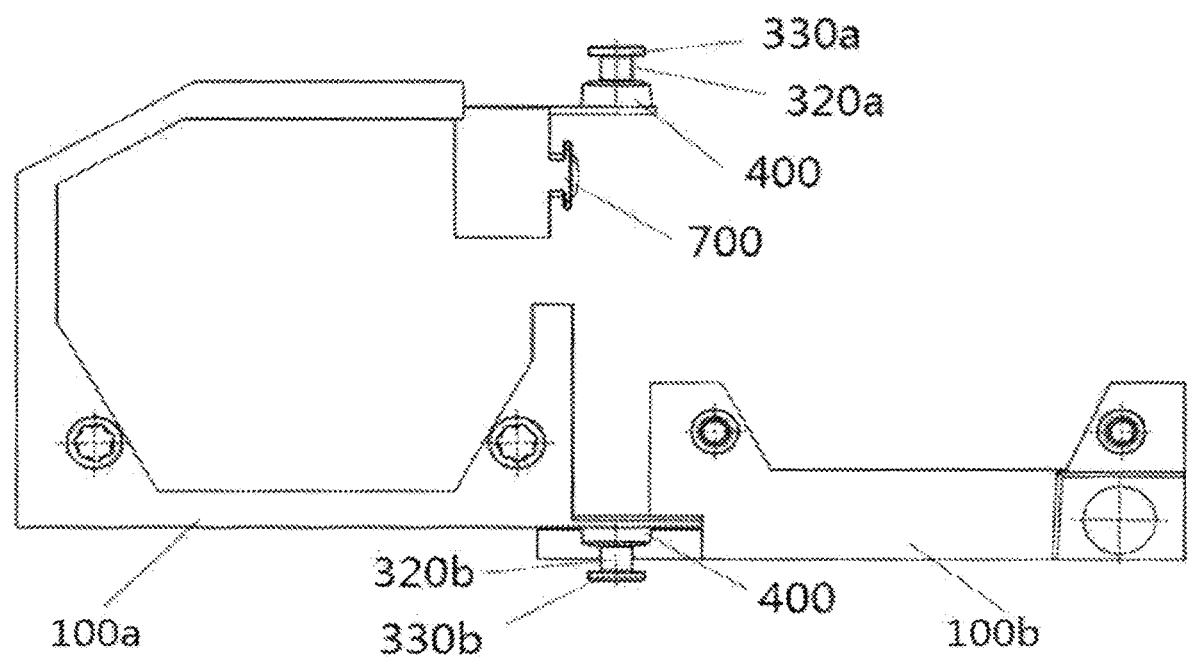
FIG. 6 schematically shows a structural diagram, from a front angle, for a supporting bracket according to an embodiment of the present invention.

Still referring to FIGS. 4 to 6, FIG. 4 schematically shows, from a front angle, an aiming mechanism according to an first example of the present invention; FIG. 5 schematically shows a three-dimensional structure of a supporting bracket according to an embodiment of the present invention; and FIG. 6 shows a structural diagram, from a front angle, for a supporting bracket according to an embodiment of the present invention.

On the basis of the first example shown in the drawings, the supporting bracket P1 comprises: a first supporting part 100a for supporting the high beam unit P2a; a second supporting part 100b for supporting the high beam-low beam unit P2b; and a first rotary part 300.

Next, refer to FIGS. 7 and 8; FIGS. 7 and 8 respectively schematically show a cross-sectional view of a first rotary part according to an embodiment of the present invention.

The first rotary part 300 as shown in FIGS. 7 and 8 comprises a pair of short shafts 320a and 320b.

The clamping part 330 is the end of the short shafts 320a and 320b, respectively, for fixing a position of the first rotary part 300 with respect to the housing P5.

The housing P5 is provided with a clamp matching part 800 that corresponds to the clamping part 330. The clamp matching part 800 has a cavity in which the clamping part 330 rotates, and is provided with a anti-release structure to prevent the first rotary part 300 from being released.

According to a preferred embodiment of the present invention, still referring to FIGS. 7 and 8, the first rotary part 300 is an independent component.

Specifically, the first rotary part 300 may be separated with other parts of the supporting bracket P1.

According to a solution provided by the preferred embodiment, the first rotary part 300 is further provided with an occluding part 340. The supporting bracket P1 is provided with an occlusion matching part 400 that matches the occluding part 340.

The occluding part 340 is used for occluding the first rotary part 300 with the supporting bracket P1 to drive the supporting bracket P1 and the first rotary part 300 to rotate simultaneously.

For example, the occluding part 340 may be a sawtooth structure, and the occlusion matching part 400 is a structure that closely fits the sawtooth structure; when the first rotary part 300 rotates, by connection structures that occlude with each other, the other parts of the supporting bracket P1 are driven to simultaneously rotate.

According to a preferred embodiment of the present invention, the supporting bracket P1 is integrated with the first rotary part 300.

In other words, the supporting bracket P1 is a single piece as a whole.

According to a solution provided by this preferred embodiment, the first rotary part 300 is short shafts 320 integrated on the upper and lower rims of the supporting bracket P1; the upper short shaft 320a, from the upper rim and with the rotation axis EE' as the central axis, extends upwards and clamps with the housing P5; the lower short shaft 320b, from the lower rim and with the rotation axis EE' as the central axis, extends downwards and clamps with the housing P5.

According to a solution provided by the preferred embodiment, the first rotary part 300 is a cavity structure 350 integrated on the supporting bracket P1, and a rotation axis structure 900 is integrated on the housing P5 according to the present invention. Both the cavity structure 350 and the rotation axis structure 900 are rotatable about the rotation axis EE'.

The rotation axis structure 900 and the housing P5 are single piece; the rotation axis structure 900 comprises an upper rotation axis 900a and a lower rotation axis 900b; the cavity structure 350 of the supporting bracket P1 comprises an upper cavity 350a that matches the upper rotation axis 900a, and a lower cavity 350b that matches the lower rotation axis 900b. The cavity structure 350 is rotatable about the rotation axis structure 900.

For example, the cavity structure 350 is a cylindrical structure comprising a cylindrical upper cavity 350a that is recessed downwards from the upper rim of the supporting bracket P1, and a cylindrical upper cavity 350b that is convex upwards from the lower rim of the supporting bracket P1; the rotation axis structure 900 integrated on the housing P5 comprises an upper rotation axis 900a and a lower rotation axis 900b; the upper and lower rotation axes may be respectively accommodated in the corresponding upper and lower cavities, and when the supporting bracket P1 is pushed, the cavity structure 360 rotates about the rotation axis structure 900.

According to another preferred embodiment of the present invention, refer to FIGS. 10 to 16. The supporting bracket P1 according to the present invention further comprises a second rotary part 500; the second rotary part is used for causing the first supporting part 100 and the second supporting part 200 to simultaneously rotate in a vertical direction.

The second rotary part 500 is connected to the low beam unit P2a and the high beam unit P2b, respectively, by a universal connection structure 600.

Preferably, the supporting bracket P1 according to the present invention is further provided with a first sliding part 700, and the second rotary part 500 is provided with a second moving part 510 that matches the first moving part 700, so that the second rotary part 500 may slide in the forward and backward directions of the supporting bracket P1 by coordination between the first moving part 700 and the second moving part 510.

The first movable part 700 and the second movable part 510 may be any structure that can allow the second rotary part 500 to move back and forth along the supporting bracket P1.

Figure 14A:
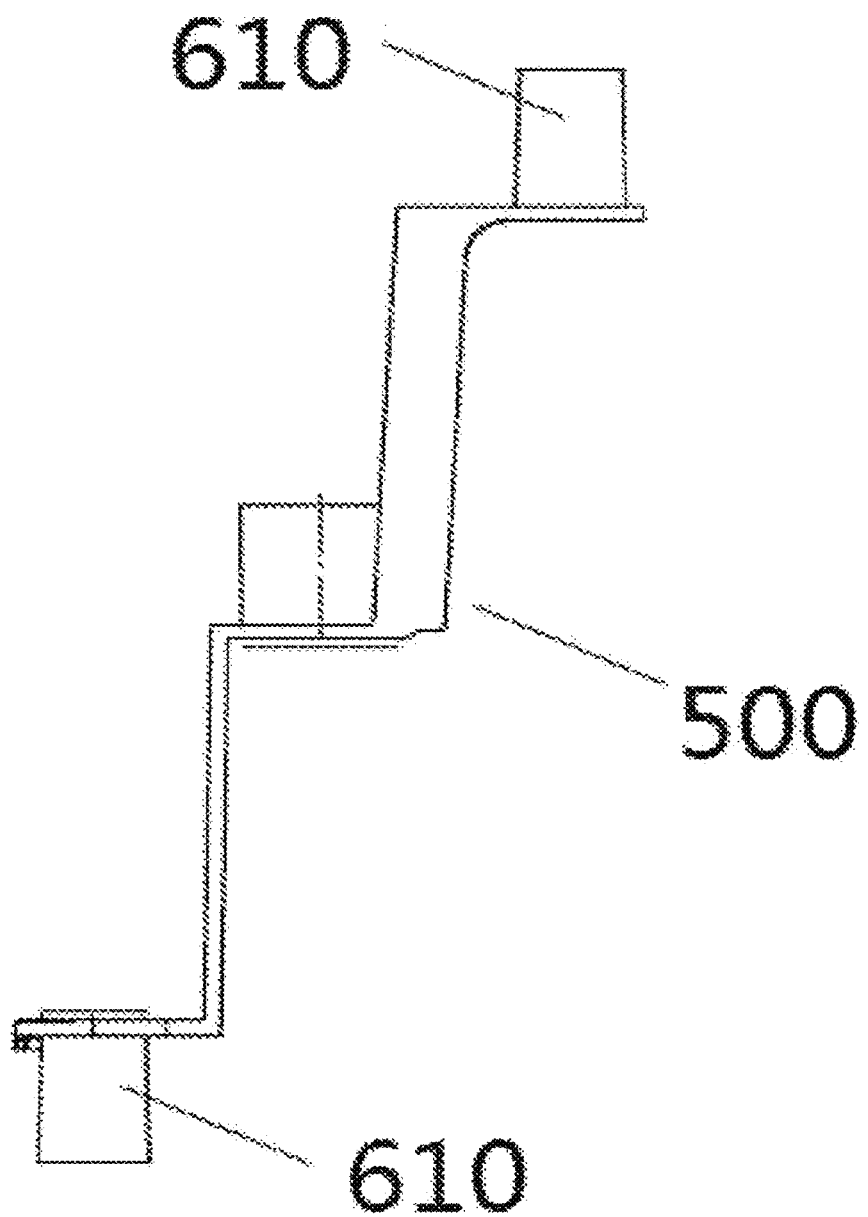
FIGS. 14a, 14b, and 14c respectively schematically show a structural diagram for a second rotary part according to an embodiment of the present invention.
Figure 14B:
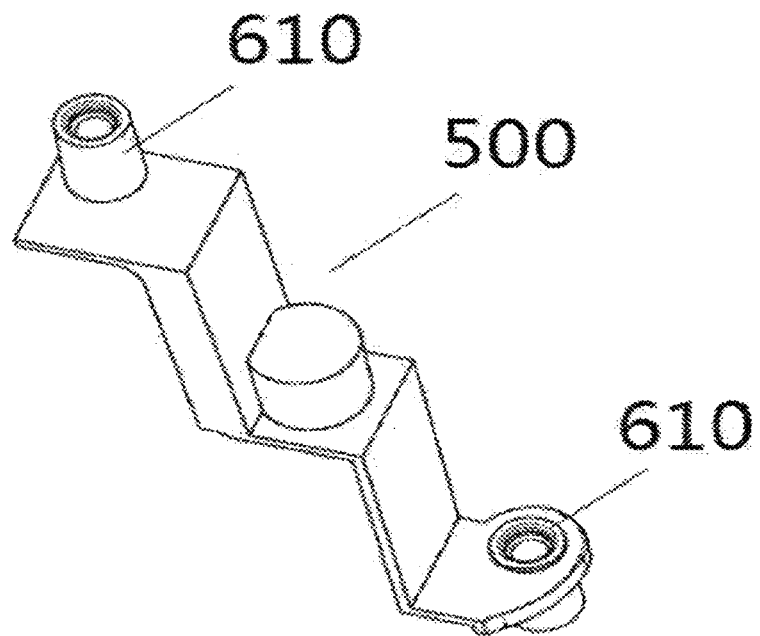
Figure 14C:
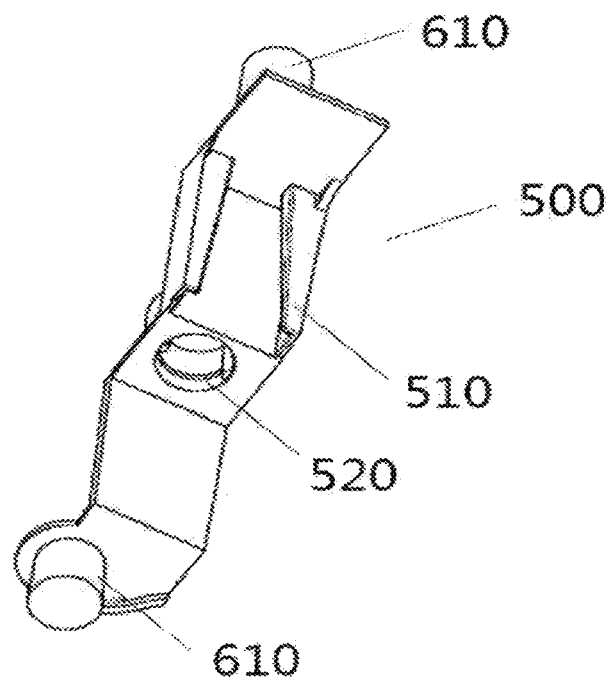
Figure 15:
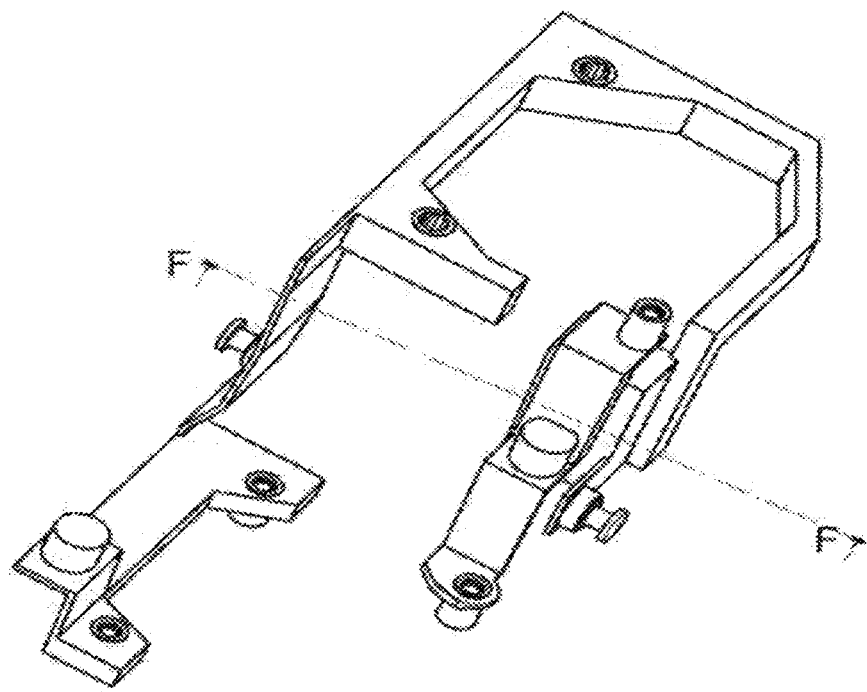
FIG. 15 shows a schematic diagram for a three-dimensional structure of a supporting bracket according to an embodiment of the present invention.
Figure 16:
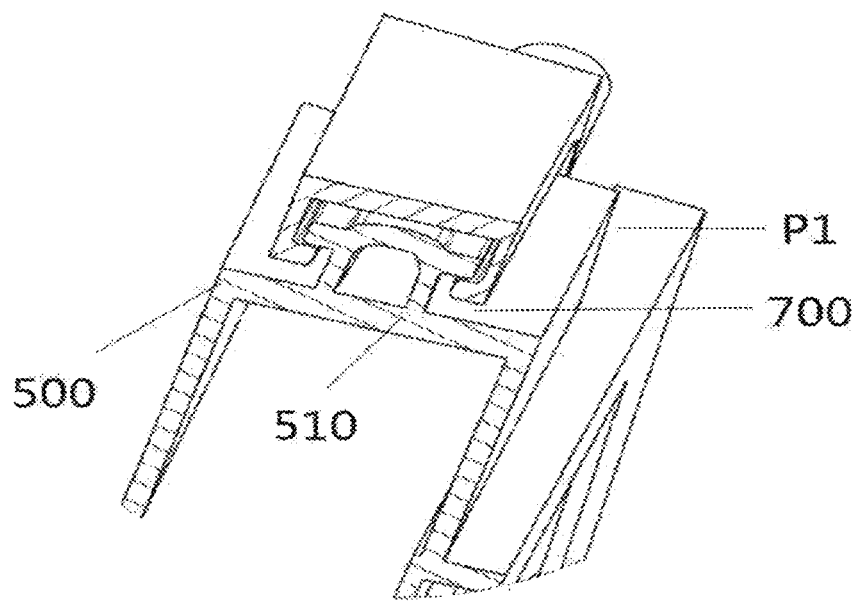
FIG. 16 shows a cross-sectional view of the supporting bracket shown in FIG. 15 along the line FF' according to an embodiment of the present invention.

Preferably, referring to FIGS. 14c, 15 and 16, according to the first example of the present invention, the first movable part 700 of the supporting bracket P1 is a sliding chute structure, and the second rotary part 500 is provided with a sliding part that matches the sliding chute structure, so that the second rotary part 500 can slide back and forth along the sliding chute structure.

When sliding back and forth along the sliding chute structure 700, the second rotary part 500 pushes and pulls the at least one light-emitting unit P2 simultaneously to tilt downwards or upwards in a vertical direction around the respective universal connection structure 600.

In the present invention, movement towards the front side of the light-emitting unit P2 is forwards, and movement towards the back side of the light-emitting unit P2 is backwards.

A method for aligning vehicle headlights according to the present invention, the vehicle headlight adopting an aiming mechanism according to the present invention, wherein the aiming method comprising Step 1 and Step 2.

In Step 1, the first pushing part P3 is adjusted so that the first pushing part P3 pushes and pulls the supporting bracket P1, causing the supporting bracket P1 to rotate about the rotation axis EE' of its first rotary part 300; in other words, the at least one supporting part (100) rotates simultaneously about the rotation axis, so that the light-emitting unit P2 rotates simultaneously in a horizontal direction.

In Step 2, the second pushing part (P4) is adjusted so that the second pushing part (P4) slides back and forth along the sliding chute structure (700) of the supporting bracket (P1), while pushing and pulling the at least one light-emitting unit (P2) to simultaneously tilt downwards or upwards in a vertical direction about the respective universal connection structure (600).

Those of ordinary skill in the art should understand that Step 1 and Step 2 do not need to follow a specific sequence; Step 1 may be performed before Step 2, or Step 2 may be performed before Step 1; alternatively, Step 1 and Step 2 may be performed at the same time.

Figure 19:
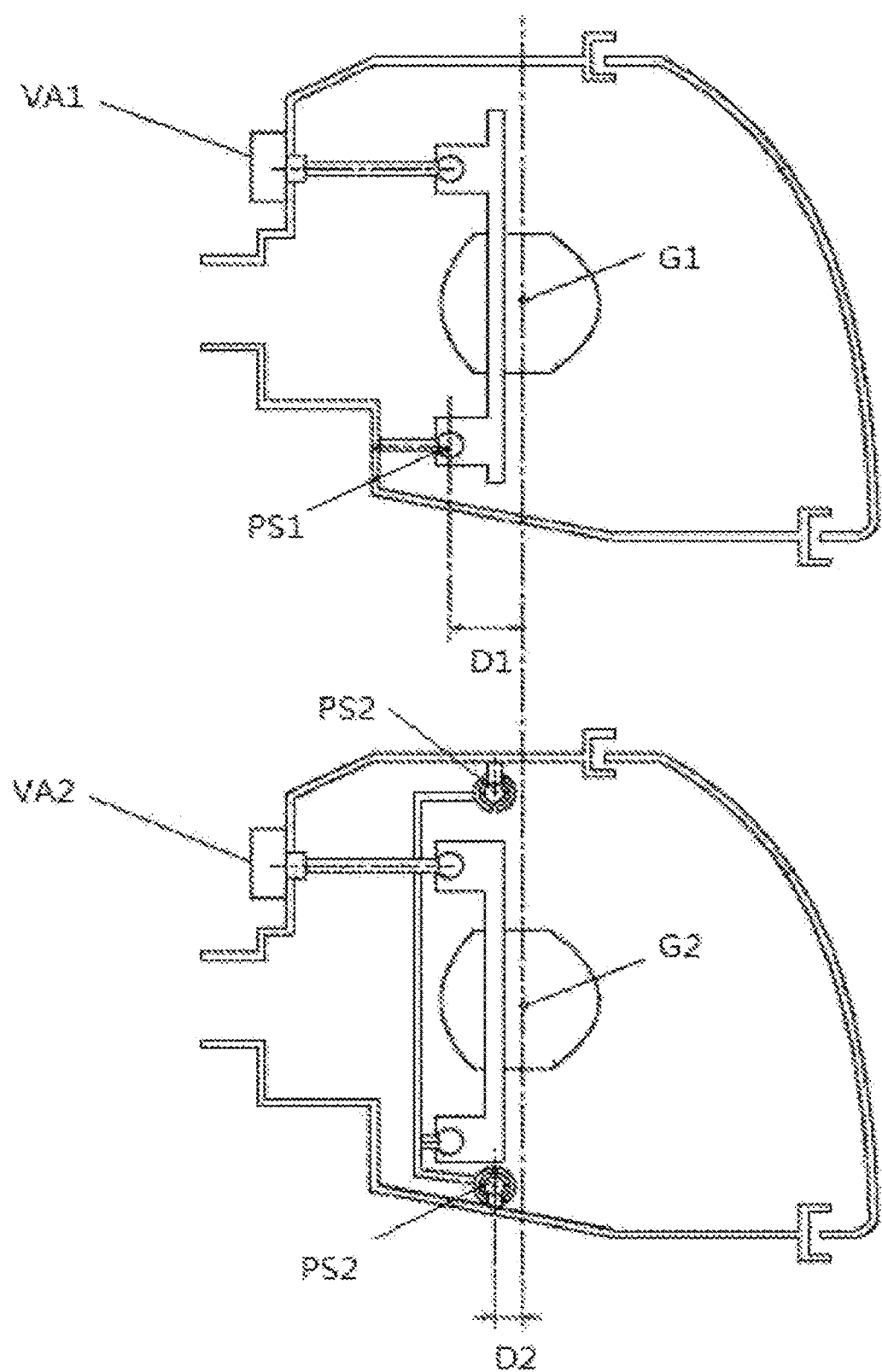
FIG. 19 shows a schematic diagram comparing an embodiment of the present invention and the prior art in terms of center-of-gravity distance.

See FIG. 19. FIG. 19 shows a change in the center-of-gravity distance of the light group unit according to an embodiment of the present solution.

The upper part of FIG. 19 shows a scenario in the prior art where, for a light-emitting unit, the center of gravity of the existing aiming mechanism is located at G1, the vertical adjustment mechanism is VA1, the turning point is located at PS1, and the distance between the center of gravity G1 and the turning point is D1; the lower part of FIG. 19 shows a scenario according to an embodiment of the present invention where, for a light-emitting unit, the center of gravity of the aiming mechanism is located at G2, the vertical adjustment mechanism is VA2 (that is, the second pushing part P4), the turning point corresponding to the second pushing part P4 is PS2, and the distance between the center of gravity G2 and the turning shaft PS2 is D2. It is readily apparent to those of ordinary skill in the art that although the positions of the centers of gravity in the two solutions remain unchanged, the distance D2 between the center of gravity and the turning shaft in this solution is significantly smaller than D1; therefore, the moment of force exerted on the turning point is smaller. Moreover, according to a solution provided by the present invention, since each light-emitting unit may be provided with two turning points, it is structurally more stable.

Obviously, since the supporting bracket is connected to the housing by its own first rotary part, the center of gravity of the bracket is brought closer to the turning point, so that the moment of force formed by the distance between the center of gravity of a light-emitting unit and the turning point is greatly reduced; thus, the load-bearing requirement for the supporting bracket is reduced; in other words, the requirement for the strength of a material used to manufacture the supporting bracket is reduced, which allows a great reduction in material cost.

It is readily apparent to those of ordinary skill in the art that the present invention is not limited to the details given in the above-described exemplary embodiments, and that the present invention may be implemented in other specific modes without departing from the spirit or basic characteristics of the present invention. Therefore, from any perspective, an embodiment should be deemed to be exemplary and non-limiting, and the scope of the present invention should be defined by the attached claims but not by the above descriptions. Therefore, it is intended to include all changes that fall within the definition and scope of equivalent essentials of the claims in the present invention. No reference numerals specified in a claim should be construed as limiting the claim involved. In addition, the term "comprise" clearly does not exclude any other unit or step, and a singular does not exclude the plural. A plurality of units or apparatuses presented in system claims may also be realized by one unit or apparatus by means of software or hardware. Terms such as "first" and "second" are used to indicate designations, and do not indicate any specific order.

The invention claimed is:

1. A supporting bracket for a vehicle headlight, the supporting bracket comprising:
   at least one supporting part configured to support at least one light-emitting unit;
   a first rotary part, the first rotary part configured to cause the at least one supporting part to rotate simultaneously in a horizontal direction about a rotation axis of the first rotary part; and
   a second rotary part configured to cause the at least one light-emitting unit to rotate simultaneously in a vertical direction.

2. The supporting bracket as claimed in claim 1, wherein the first rotary part is provided with a long shaft that is coaxial with the rotation axis.

3. The supporting bracket as claimed in claim 1, wherein
   the first rotary part comprises a pair of short shafts,
   the short shafts comprise an upper short shaft and a lower short shaft, and
   both the upper short shaft and the lower short shaft are coaxial with the rotation axis.

4. The supporting bracket as claimed in claim 1, wherein
   the first rotary part comprises a cavity structure, and
   the cavity structure is configured to accommodate a corresponding rotation axis structure and rotate based on the rotation axis.

5. The supporting bracket as claimed in claim 1, wherein the first rotary part is further configured to connect the supporting bracket to a housing in a direction of the rotation axis.

6. The supporting bracket as claimed in claim 5, wherein
   a clamping part is provided at two ends of the first rotary part, and
   the supporting bracket is configured to clamp with the housing in an extension direction of the rotation axis by the clamping part of the first rotary part.

7. The supporting bracket as claimed in claim 1, wherein the first rotary part is an independent component.

8. The supporting bracket as claimed in claim 7, wherein the first rotary part further comprises:
   an occluding part, the occluding part being configured to cause the first rotary part to occlude with the supporting bracket, thereby driving the supporting bracket and the first rotary part to rotate simultaneously.

9. The supporting bracket as claimed in claim 1, wherein the supporting bracket is integrated with the first rotary part.

10. The supporting bracket as claimed in claim 1, wherein the second rotary part and the at least one light-emitting unit are respectively connected by a universal connection structure.

11. The supporting bracket as claimed in claim 10, wherein the supporting bracket is further provided with a first movable part, and the second rotary part is provided with a second movable part that matches the first movable part, so that the second rotary part may slide along forward and backward directions of the supporting bracket by coordination between the first movable part and the second movable part.

12. The supporting bracket as claimed in claim 11, wherein when sliding back and forth along the first movable part, the second rotary part is configured to push and pull the at least one light-emitting unit simultaneously to tilt downwards or upwards in the vertical direction around the respective universal connection structure.

13. A vehicle light, comprising:
   the supporting bracket as claimed in claim 1; and
   the at least one light-emitting unit, wherein
   the at least one supporting part comprises a first supporting part and a second supporting part,
   the at least one light-emitting unit comprises a first light-emitting unit and a second light-emitting unit,
   the first light-emitting unit includes a high beam unit, and
   the second light-emitting unit includes a high beam-low beam unit.

14. A housing for a vehicle light, comprising:
   the supporting bracket as claimed in claim 1,
   wherein the housing is provided with a clamp matching part that matches the first rotary part so that the supporting bracket is mounted on the housing.

15. The housing as claimed in claim 14, wherein
   the supporting bracket is provided with a cavity structure,
   the housing is provided with a rotation axis structure, and the rotation axis structure being capable of rotating in the cavity structure.

16. An aiming mechanism for the vehicle headlight, the aiming mechanism comprising:
the supporting bracket as claimed in claim 1;
a first pushing part configured to push the supporting bracket to rotate in the horizontal direction, thereby driving the at least one light-emitting unit to rotate simultaneously in the horizontal direction; and
a second pushing part configured to push the at least one light-emitting unit to simultaneously tilt downwards or upwards in the vertical direction.

17. The aiming mechanism as claimed in claim 16, wherein a position of the rotation axis of the first rotary part of the supporting bracket is determined on a basis of a maximum adjustment distance of the first pushing part and a maximum rotation angle of the supporting bracket.

18. The aiming mechanism as claimed in claim 16, wherein the first pushing part and the second pushing part are configured to adopt at least one of the following adjustment methods:
a manual adjustment; and
an adjustment by a motor.

19. The aiming mechanism as claimed in claim 18, wherein
the first pushing part configured to be adjusted manually, and
the second pushing part is configured to be adjusted by drive of the motor.

20. The aiming mechanism as claimed in claim 16, further comprising:
a housing for a vehicle light, wherein
the housing is provided with a clamp matching part that matches the first rotary part of the supporting bracket so that the supporting bracket is mounted on the housing, and
the supporting bracket is provided with a cavity structure, the housing is provided with a rotation axis structure, and the rotation axis structure being capable of rotating in the cavity structure.

21. A vehicle light, comprising:
the aiming mechanism as claimed in claim 16.

22. A vehicle, comprising:
the vehicle light as claimed in claim 21.

23. A method for aligning vehicle headlights, the vehicle headlights including the aiming mechanism as claimed in claim 16, the method comprising:
adjusting the first pushing part so that the first pushing part pushes and pulls the supporting bracket, causing the at least one supporting part to rotate simultaneously about the rotation axis, so that the light-emitting unit rotates simultaneously in the horizontal direction; and
adjusting the second pushing part so that the second pushing part slides back and forth, causing the at least one light-emitting unit to simultaneously tilt downwards or upwards in the vertical direction.

24. An aiming mechanism for a vehicle headlight, the aiming mechanism comprising:
a supporting bracket including:
at least one supporting part configured to support at least one light-emitting unit, and
a first rotary part, the first rotary part configured to cause the at least one supporting part to rotate simultaneously in a horizontal direction about a rotation axis of the first rotary part;
a first pushing part configured to push the supporting bracket to rotate in the horizontal direction, thereby driving the at least one supporting part to rotate simultaneously in the horizontal direction; and
a second pushing part configured to push the at least one light-emitting unit to simultaneously tilt downwards or upwards in a vertical direction.

* * * * *